UNITED STATES PATENT OFFICE.

MELVIN B. CHURCH, OF GRAND RAPIDS, MICHIGAN.

ORNAMENTATION OF WALLS.

SPECIFICATION forming part of Letters Patent No. 409,012, dated August 13, 1889.

Application filed June 11, 1889. Serial No. 313,903. (No specimens.)

*To all whom it may concern:*

Be it known that I, MELVIN B. CHURCH, of Grand Rapids, in the county of Kent and State of Michigan, have invented a new and useful Improvement in the Ornamentation of Walls, &c.; and I do hereby declare that the following is a full, clear, and exact description of the same.

My invention has for its object the covering of walls, ceilings, and other surfaces of the interior of buildings. It consists of a composition the base or principal ingredient of which is finely-pulverized calcined gypsum. To this is added a small proportion of glue, and also, preferably, a small proportion of sulphate of zinc. This composition is well known to the trade under the name of "Alabastine," and was patented to me by the United States Patent Office under date of April 4, 1882, No. 255,937. This is well adapted to be used in a liquid form for plain wall-coating, and will remain in that form one to three hours, according to the conditions, without setting; but for use in a thicker plastic form its tendency to set is too strong. The special object of the present invention is to produce a gypsum composition capable of resisting to a sufficient degree the tendency of the gypsum to absorb water of crystallization, so that it may be used by workmen to form a wall-coating of plastic material and work the same into desired figures and any form of ornamentation while the material is still soft upon the surface to be ornamented and still retain the benefit of the setting properties of the gypsum. This takes the place of compositions of lead and paste mixtures now used in this way. This being a cement of much the same nature as the wall, is as permanent as the wall and is less expensive, as it does not require painting, as other surface finishings do, as the white-lead and similar finishings. Such a composition may be used in the place of the papier-maché coverings, which are molded and pressed in sheets and require for their manufacture costly molds; further, such a composition is designed to give full scope to the best talent of the workman or artist, as it admits of the formation of the figures and ornamentation upon the walls, and such ornamentation so made, while preserving its general plan, may be varied at will, while the embossed or molded sheet can only be duplicated or multiplied on the wall in precisely the same form.

In carrying out my invention I take alabastine or an equivalent material (as in Letters Patent of the United States No. 255,937) and add thereto a fatty matter in sufficient quantity to retard the setting, but not enough to impair its setting qualities or to prevent the tints from drying out clear. For this I find oil or glycerine a suitable ingredient. The gypsum composition above referred to consists, substantially, of finely-powdered calcined gypsum mixed with glue in the proportion of seven to eight pounds of the best glue to each one hundred pounds of the gypsum, and preferably with the additional mixture of one and a half pound of sulphate of zinc. These ingredients are all mixed thoroughly in a dry finely-powdered condition, and may be used also with some mineral coloring-matter. I prefer to add the fatty matters by first mixing them with a portion only of the gypsum composition. I take, for example, twenty-five pounds of the alabastine in the form of dry powder, and to this add about one pound of oil or glycerine and about two pounds more of glue finely pulverized to the twenty-five per cent. of the alabastine. This mixture I dissolve in hot water. Then I add the remainder of the one hundred pounds of alabastine material, less the two pounds of glue. This is done in the following manner: The twenty-five pounds of powder are reduced first to a plastic condition with hot water, and the oil or glycerine is then added and thoroughly mixed. In order to cause the oil more readily to unite, a small percentage (say ten per cent. of the remaining seventy-five pounds) may well be added here. This is all well mixed and then dried quickly, in order that the gypsum may not take up water of crystallization while drying. The two pounds of glue are added to prevent this taking up of water, and the whole subsequently finely ground when dry. To this is added, thoroughly mixed, the remainder of the one hundred pounds of alabastine in dry pulverized condition to complete the composition. This is then in condition for transportation, storage, or sale. To prepare it for use, it is reduced to plastic condition by adding hot water till it is brought to a proper consistency for working. The same material may be used with good effect in liquid form for plain coating.

Although I have described the composition as specifically adapted for covering walls and other surfaces, it is also obviously as well adapted for molding forms of any kind.

As a form of fatty matter, soap may be used, this being an equivalent for that purpose; also, paraffine cut in turpentine or naphtha may be used as an equivalent. It is better to use a small percentage of oil with the soap or paraffine.

I claim as my invention—

The composition herein described, consisting of gypsum, glue, and a fatty matter, substantially as described.

In testimony whereof I have signed my name to this specification in the presence of two subscribing witnesses.

MELVIN B. CHURCH.

Witnesses:
   G. W. BALLOCH,
   WALTER DONALDSON.